UNITED STATES PATENT OFFICE.

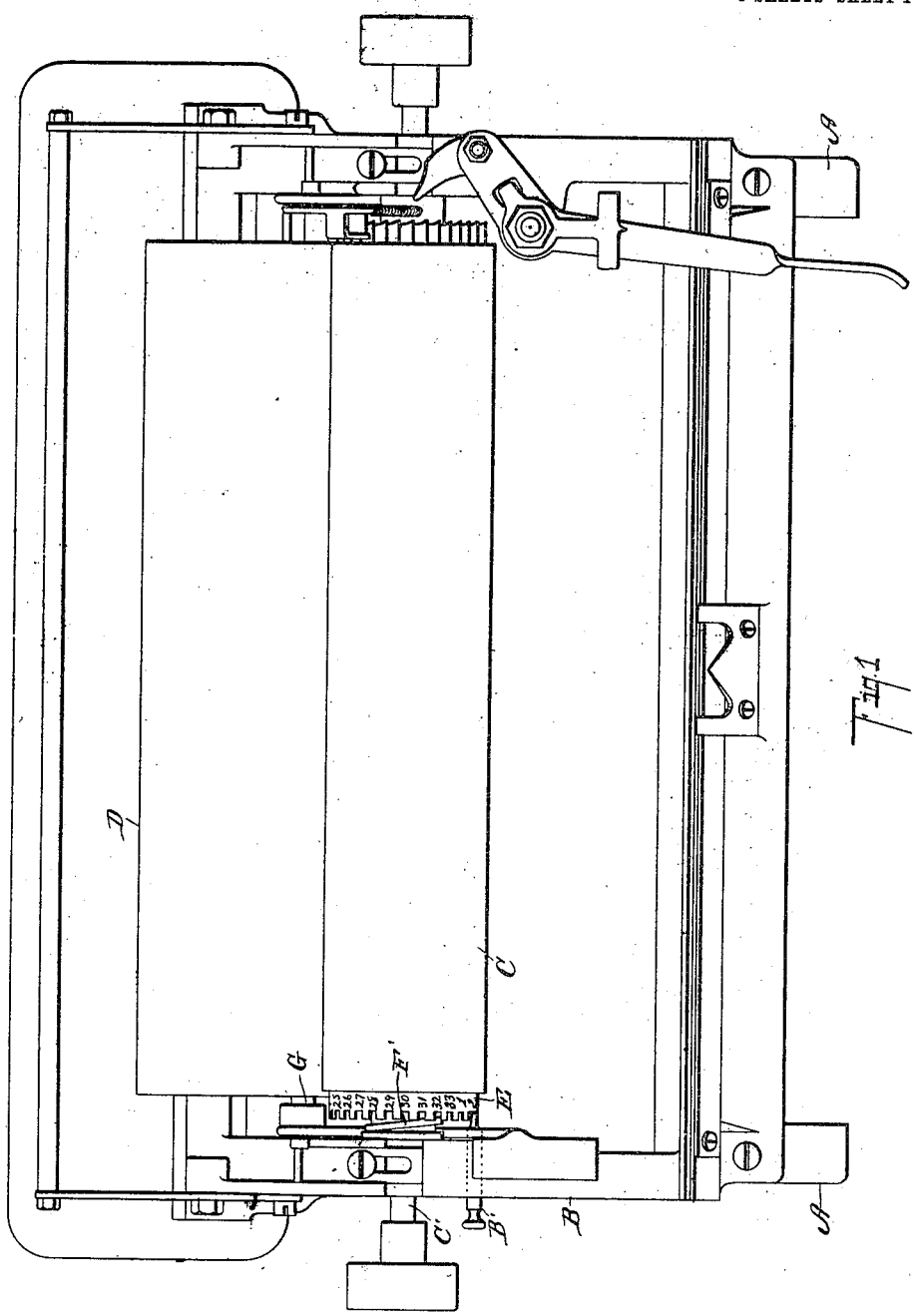

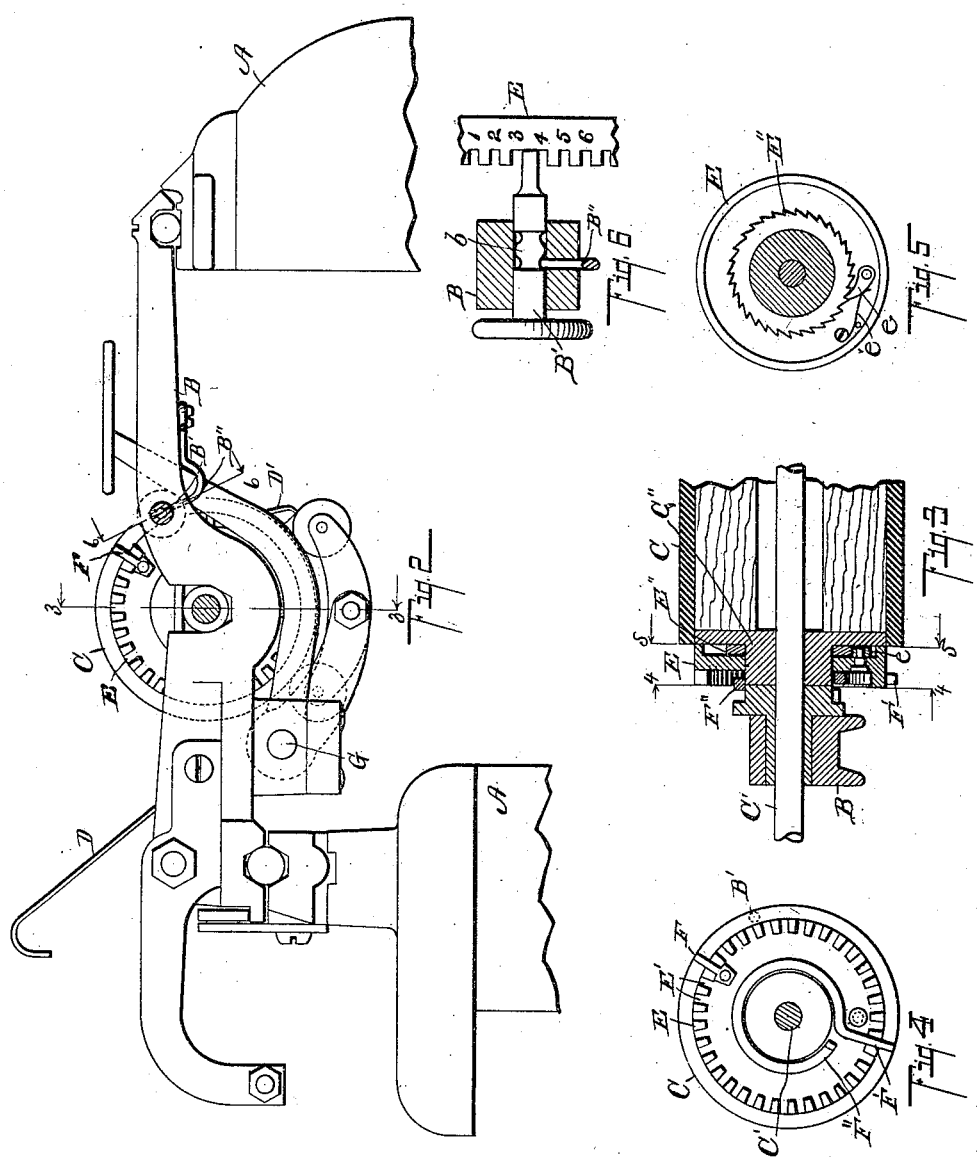

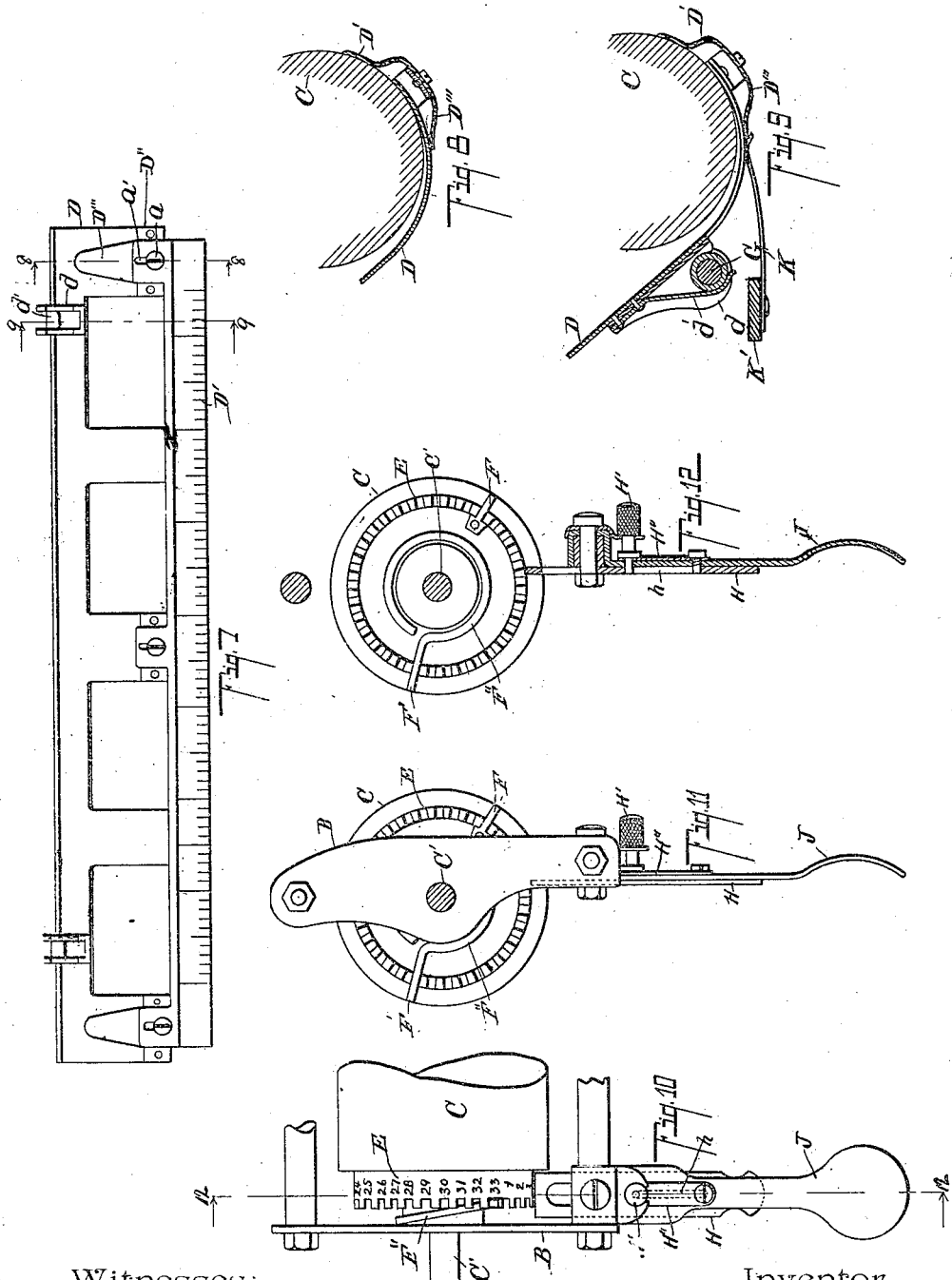

WILLIAM R. FOX AND HIRAM W. FOX, OF GRAND RAPIDS, MICHIGAN.

SCALE AND SCALE ATTACHMENT FOR TYPE-WRITING MACHINES.

1,096,223.  Specification of Letters Patent.  Patented May 12, 1914.

Application filed March 4, 1907. Serial No. 360,424.

*To all whom it may concern:*

Be it known that we, WILLIAM R. FOX and HIRAM W. FOX, citizens of the United States, residing at Grand Rapids, in the county of Kent, State of Michigan, have invented certain new and useful Improvements in Scales and Scale Attachments for Type-Writing Machines, of which the following is a specification.

This invention relates to improvements in scales and scale attachments for typewriting machines.

The objects of this invention are,—First, to provide an improved construction of annular scale for use on a typewriting machine; second, to provide an improved adjustable paper scale especially adapted for use in conjunction with an annular scale.

Further objects relating to details of construction will definitely appear from the detailed description to follow.

We accomplish the objects of our invention by the devices and means described in the following specification.

The invention is clearly defined and pointed out in the claims.

A structure embodying the features of our invention is clearly illustrated in the accompanying drawing, forming a part of this specification, in which,—

Figure 1 is a plan view of the top portions of the frame of a typewriter, with its carriage and platen in position; Fig. 2 is an end elevation view taken from the left hand side of Fig. 1, the platen spindle being in section; Fig. 3 is a detail longitudinal sectional view taken on line 3—3 of Fig. 2; Fig. 4 is a detail sectional view taken on line 4—4 of Fig. 3, showing the details of construction of the annular scale at the end of the platen; Fig. 5 is a detail sectional view taken on line 5—5 of Fig. 3, showing the details of construction of the annular scale at the end of the platen; Fig. 6 is a detail view of the form of stop pin or device for use in connection with the adjustable stops of the annular scale, as used on a front strike machine; Fig. 7 is a detail view of the paper scale detached from the platen, the view being taken from the underside; Fig. 8 is a detail transverse sectional view through the paper scale and platen, taken on a line corresponding to line 8—8 of Fig. 7; Fig. 9 is a detail transverse sectional view through the paper scale and platen, taken on a line corresponding to line 9—9 of Fig. 7; Fig. 10 is an enlarged detail plan view of a modified form of stop device as adapted for use on an understrike machine; Fig. 11 is a detail side elevation view of the portions appearing in Fig. 10; and Fig. 12 is a detail sectional view taken on line 12—12 of Fig. 10.

In the drawing, similar letters of reference refer to similar parts throughout the several views, and the sectional views are taken looking in the direction of the little arrows at the ends of the section lines.

Referring to the lettered parts of the drawing: A is the frame of a typewriting machine, preferably of the improved front-strike Fox machine.

B is the carriage, suitably supported to reciprocate on the frame of the machine.

C is the platen supported on suitable spindles C'.

C'' is the head of the platen, provided with a suitable projecting hub which is turned true to form a journal to receive the parts constituting the annular scale.

D is a paper guide. A scale D' is supported at the front of the same by suitable set screws $a$, which extend into brackets D'' through slots $a'$, in the scale, these slots fitting the screws loosely to permit of slight longitudinal adjustment and being of considerable length and transverse to the scale to permit its effective lateral adjustment on the paper guide D to adjust it one or more spaces below the printing point on the cylinder. Fingers D''' extend rearwardly from the scale D' and contact with the paper guide D to insure proper support for the same. The scale D' is curved inwardly and extended into proper relation to the platen C. The paper guide is supported on the transverse rod G by suitable hook brackets $d$ engaging over either the rod G or suitable bushings thereon. Springs $d'$, curved to engage the rods, are secured to the back part of the paper guide or table to properly retain the same in place. The details of this device clearly appear in Figs. 7 and 9. The paper guide is urged into contact with the platen C by a spring K secured to a portion K' of the carriage B, the relation of this spring to the paper guide being clearly indicated in Fig. 9.

The annular scale on the end of the platen consists of the scale wheel E which is provided with a scale on its periphery corresponding to the line spaces of the platen. Notches E' are formed on its face, making the face of the scale wheel somewhat similar to a face gear. Secured to the platen head C'' is a ratchet wheel E''. The annular scale wheel E is recessed to receive the same. The pawl e is secured to the scale wheel E on a suitable pivot and is held normally in engagement with the ratchet wheel E'' by the spring e'. On the face of the annular scale wheel E is secured the stop tooth F, which extends out beyond the periphery and fills one of the notches E'; the proper location is to have it fill the notch bearing the highest numeral on the scale. An adjustable tooth F' is provided which is formed on the end of the spring F'' which is bent to embrace the hub of the hub C'' and is given a helical form to urge it normally into engagement with the notches E' on the face of the annular scale wheel E so that this tooth F' can be adjusted to any point on the scale by simply pushing out toward the end and moving it or the platen to the relative position described. Where the device is used on the improved Fox front-strike machine, a stop pin B' is provided, detailed at Fig. 6, and its position shown in Fig. 2, for engaging these teeth F and F', the stop pin being adjustable so that it can be thrown into and out of relation with the stop teeth on the annular scale.

Shoulders, with a bulging part between, are cut in the stop pin and a spring B'' is provided to engage the same and hold the pin yieldingly in position in whichever position it is adjusted, out or in. The spring B'' fully appears in Fig. 2; the position of its free end appears in Fig. 6. Where the machine is of the understrike type, a different stop is used, like that appearing in Figs. 10, 11 and 12, the stop being a slide H which is adjustable on the carriage lever or handle J. A pin H' is provided to lock the stop in position by projecting through a slot h therein, the pin being urged downwardly by a spring H''. The slot H appears in Fig. 12 and is indicated by dotted lines in Fig. 10. The end of this stop h is moved into position as indicated in Fig. 10, and it can obviously be withdrawn out of engagement at any time.

In using our improved scale, after the proper adjustment of the paper scale D', the movable tooth F' is advanced on the scale to a point between 25 and 30. The fixed tooth F is above the stop on the carriage. Where it is intended to use the device with a bill head, the bill head is then put in position and the platen revolved until the paper shows just even with the edge of the platen scale. Then the annular scale is revolved with the left hand until the fixed tooth F strikes or contacts with the stop F'. The stop is then withdrawn and the platen turned until the date line appears. Notice on the annular scale what number stands opposite the stop F'; turn the annular scale backward and then move the movable tooth F' into the notch thus indicated. This, in operation, will give the necessary spaces on the paper between the last entry on the sheet and the new date line. If it is desired to condense the work more, the tooth may be advanced one or more notches, each notch representing a space. It will thus be seen that, after inserting the main record sheet with the carbons, the stops can be turned to proper position and additional sheets can be inserted into the typewriter, as the occasion arises for making out smaller statements, and the whole will be properly spaced in making the additional entries so that complete carbon copies for record purposes can be kept while short invoices or items are being filled out.

Having thus described our invention, what we claim as new and desire to secure by Letters Patent is:

1. In a scale for typewriters, the combination of the platen; the paper guide with the adjustable scale to the front thereof; an annular scale consisting of the scale wheel with notches on its face and a scale on its periphery journaled on a hub on the end of the platen; a ratchet wheel secured to the end of said platen; a pawl carried by said scale wheel for engaging said ratchet; a fixed tooth on the face of the said scale wheel; an adjustable tooth consisting of a spring with projecting ends for adjustment in any of the notches on the face of the said wheel; a stop on the carriage adjustable into and out of engagement with the said teeth on the annular scale; a spring holding said stop yieldingly in position, all co-acting substantially as described and for the purpose specified.

2. In a scale for typewriters, the combination of the platen; the paper guide with the adjustable scale to the front thereof; an annular scale consisting of the scale wheel with notches on its face and a scale on its periphery journaled on a hub on the end of the platen; a ratchet wheel secured to the end of said platen; a pawl carried by said scale wheel for engaging said ratchet; a fixed tooth on the face of the said scale wheel; an adjustable tooth consisting of a spring with projecting ends for adjustment in any of the notches on the face of the said wheel; a stop on the carriage adjustable into and out of engagement with the said teeth on the annular scale, all co-acting substantially as described and for the purpose specified.

3. In a scale for typewriters, the combination of the platen; an annular scale consisting of the scale wheel with notches on its face and a scale on its periphery journaled on a hub on the end of the platen; a ratchet wheel secured to the end of said platen; a pawl carried by said scale wheel for engaging said ratchet; a fixed tooth on the face of the said scale wheel; an adjustable tooth consisting of a spring with projecting ends for adjustment in any of the notches on the face of the said wheel; a stop on the carriage adjustable into and out of engagement with the said teeth on the annular scale; a spring holding said stop yieldingly in position, all co-acting substantially as described and for the purpose specified.

4. In a scale for typewriters, the combination of the platen; an annular scale consisting of the scale wheel with notches on its face and a scale on its periphery journaled on a hub on the end of the platen; a ratchet wheel secured to the end of said platen; a pawl carried by said scale wheel for engaging said ratchet; a fixed tooth on the face of the said scale wheel; an adjustable tooth consisting of a spring with projecting ends for adjustment in any of the notches on the face of the said wheel; a stop on the carriage adjustable into and out of engagement with the said teeth on the annular scale, all co-acting substantially as described and for the purpose specified.

5. In an annular scale for a typewriter, the combination with the platen having a projecting journal, of a scale wheel embracing said journal and numbered on its periphery and with notches on its face; a ratchet wheel on the end of said platen; a pawl carried by the scale wheel; a fixed tooth on the scale wheel; an adjustable tooth at the end of a coiled spring embracing the said journal whereby the tooth can be shifted from notch to notch on the face of the wheel; a stop movable into and out of position to engage the said teeth; and a spring for holding said stop yieldingly in position, all co-acting substantially as described and for the purpose specified.

6. In an annular scale for a typewriter, the combination with the platen having a projecting journal, of a scale wheel embracing said journal and numbered on its periphery and with notches on its face; a ratchet wheel on the end of said platen; a pawl carried by the scale wheel; a fixed tooth on the scale wheel; an adjustable tooth at the end of a coiled spring embracing the said journal whereby the tooth can be shifted from notch to notch on the face of the wheel; and a stop movable into and out of position to engage the said teeth, co-acting for the purpose specified.

7. In a typewriter scale, the combination with the sheet metal paper guide with suitable means of holding it yieldingly in contact with the platen, of sheet metal brackets on said paper guide; a paper scale arranged at the front edge of the said paper guide and having lateral slots therein, the front edge of the said scale being curved inwardly and also curved to conform to the platen; set screws through the said slots whereby the scale can be adjusted to secure proper relation to the printing line and with other parts of the machine, co-acting for the purpose specified.

8. In a scale for a front-strike typewriting machine, a sheet metal paper guide with suitable means of holding it yieldingly in contact with the platen and extending underneath the same; and a scale adjustably secured to the said paper guide, conformed to the said platen and extending upwardly to within approximately a single space of the printing line, co-acting for the purpose specified.

In witness whereof, we have hereunto set our hands and seals in the presence of two witnesses.

WILLIAM R. FOX. [L. S.]
HIRAM W. FOX. [L. S.]

Witnesses:
ELLA DE VRIES,
JAMES STRASBURG.